UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

PROCESS OF MAKING A HALOGENATED RED DYE.

No. 867,714.                Specification of Letters Patent.              Patented Oct. 8, 1907.

Application filed March 23, 1907. Serial No. 364,021.

*To all whom it may concern:*

Be it known that I, GADIENT ENGI, doctor of philosophy and chemist, a citizen of the Swiss Republic, and resident of Basel, Switzerland, have invented a new and useful process for the manufacture of halogenated red vat-dyeing dyestuffs derived from the condensation product of alpha-oxythionaphthene with an isatin compound, of which the following is a full, clear, and exact specification.

In my application for United States Letters Patent Ser. No. 351443 filed January 9th, 1907, I have described the manufacture of red halogenated vat-dyeing dyestuffs by treating with a halogen, in presence of an indifferent diluent, the condensation products of equi-molecular quantities of alpha-oxythionaphthene (thioindoxyl) and of an isatin compound. Since I have found, that the chloro-derivatives of the said condensation products can also be produced by reacting directly on the said condensation products with a mixture of concentrated hydrochloric acid and of concentrated nitric acid. The properties of the chlorinated dyestuffs thus obtained are the same as those of the chlorinated product obtained according to Example II of my above mentioned application for United States Letters Patent Ser. No. 351443.

The new process is illustrated by following example: 5 parts of the product obtained by the condensation of equimolecular quantities of acid salicylthioacetic or of alpha-oxythionaphthene (thioindoxyl) with isatin are poured into a cold mixture of 20 parts of concentrated nitric acid and of 50 parts of concentrated muriatic (hydrochloric) acid and the whole is warmed on the water bath in a reflux apparatus gradually to 50° C. and maintained at this temperature during 3 to 5 hours. After cooling the mass of reaction is poured into 600 liters water, filtered, washed and dried, the chlorinated product thus obtained being in the form of a dull red, crystalline powder. This dyestuff has the same properties as the product described in Example II of my application for Letters Patent Ser. No. 351443.

What I claim is:

1. The herein described process for the manufacture of red vat-dyeing dyestuffs by treating with a mixture of concentrated hydrochloric acid and of concentrated nitric acid the products resulting from the condensation of one mol. of alphaoxythionaphthene with one mol. of an isatin compound.

2. The herein described process for the manufacture of a red vat-dyeing dyestuff, by treating with a mixture of concentrated hydrochloric acid and of concentrated nitric acid the product resulting from the condensation of one mol. of alphaoxythionaphthene with one mol. of isatin.

In witness whereof I have hereunto signed my name this 2 day of March 1907, in the presence of two subscribing witnesses.

GADIENT ENGI.

Witnesses:
GEO. GIFFORD,
AMAND BRAUN.